United States Patent [19]

Fromuth et al.

[11] 4,264,487
[45] Apr. 28, 1981

[54] ACRYLATE RUBBER MODIFICATION OF AROMATIC POLYESTERS

[75] Inventors: Harry C. Fromuth, Trevose, Pa.; Kenneth M. Shell, Foster City, Calif.

[73] Assignee: Rohm and Haas Company, Philadelphia, Pa.

[21] Appl. No.: 73,352

[22] Filed: Sep. 7, 1979

[51] Int. Cl.$^3$ .................. C08L 53/00; C08L 67/02; C08L 67/06
[52] U.S. Cl. .................. 260/40 R; 260/22 R; 260/45.7 R; 260/45.7 P; 260/45.8 NT; 260/45.85 B; 260/45.85 S; 260/45.9 QB; 260/45.95 F; 260/45.95 G; 521/138; 521/139; 525/67; 525/68

[58] Field of Search ............... 525/67, 68; 260/40 R, 260/22 R, 45.7 R, 45.7 P, 45.8 NT, 45.8 S, 45.85 B, 45.85, 45.9 QB, 45.95 F, 45.95 G; 521/138, 139

[56] References Cited

U.S. PATENT DOCUMENTS

| | | | |
|---|---|---|---|
| 3,864,428 | 2/1975 | Nzkamura et al. | 525/67 |
| 4,082,895 | 4/1978 | Bzekderf et al. | 525/67 |
| 4,096,202 | 6/1978 | Farnham et al. | 260/40 R |
| 4,180,494 | 12/1979 | Frometh et al. | 260/40 R |

*Primary Examiner*—J. Ziegler
*Attorney, Agent, or Firm*—Michael B. Fein

[57] ABSTRACT

Compositions comprised of synergistic amounts of aromatic polycarbonate, acrylate-based core-shell polymer, and aromatic polyester are disclosed.

12 Claims, No Drawings

ACRYLATE RUBBER MODIFICATION OF AROMATIC POLYESTERS

BACKGROUND OF THE INVENTION

1. Field of the Invention:

This invention relates to impact modification of linear, saturated thermoplastic poly($C_2$ to $C_8$ alkylene terephthalates).

2. Description of the Prior Art:

Poly($C_2$ to $C_8$ alkylene terephthalates) are limited in their use as thermoplastic molding resins due to their relatively low notched impact strength.

Various modifier systems for improving the toughness have been suggested. Farnham and Goldman in U.S. Pat. No. 4,096,202 of June 20, 1978 have suggested an impact modification system comprised of a multiphase composite interpolymer having a first phase polymerized from a monomer system comprised of about 75–99% $C_1$ to $C_6$ alkyl acrylate, 0.1–5% crosslinking monomer, and 0.1–5% graftlinking monomer, and about 75 to 5 percent of a final, rigid, thermoplastic phase. Nakamura et al, U.S. Pat. No. 3,864,428, disclosed blends of aromatic polyester, aromatic polycarbonate, and butadiene-based, core-shell polymers wherein the polycarbonate constituted 10–75% and preferably 20–60% of the tertiary mixture. Shell and Fromuth in U.S. Pat. No. 4,180,494 of Dec. 25, 1979 disclose high impact compositions comprising about (a) 25–95% aromatic polyester, (b) about 1–8% of an aromatic polycarbonate, and (c) the balance to make 100% of a core-shell polymer having a butadiene-based core.

In the teachings of Nakamura et al and of Fromuth and Shell, only butadiene-based, core-shell impact modifiers are disclosed. Butadiene-based polymers suffer from inherent thermal instablity, which is well known to those skilled in the art, and thereby are excluded from most long-term, high temperature applications. Furthermore, polybutadiene polymers have a glass transition temperature, $T_g$, of about $-80°$ C. Acrylate-based polymers, on the other hand, such as those disclosed in this invention, have $T_g$'s of about $\leq -40°$ C. It is not obvious that an impact modifier with a significantly higher $T_g$, such as those disclosed in this invention, would function well or as efficiently as those based on a butadiene polymer.

SUMMARY OF THE INVENTION

It is therefore an object of the invention to provide high impact strength compositions based on aromatic polyesters, which also have satisfactory long-term use temperature.

It is a further object to provide high impact strength, heat resistant compositions which, when reinforced with glass fibers, also have increased heat deflection temperature.

These objects, and others which will become apparent from the following disclosure, are achieved by the present invention which comprises a high impact resistant and long-term heat resistant composition comprising (a) about 25–95% of an aromatic polyester, (b) about 1–50% of an aromatic polycarbonate, and (c) the balance to make 100% of a core-shell polymer comprising about 25–95 weight-% of a first elastomeric phase polymerized from a monomer system comprising about 75–99.8% by weight of a ($C_1$–$C_6$) alkyl acrylate, 0.1–5% crosslinking monomer, and 0.1–5% graftlinking monomer, and about 75 to 5 percent of a final, rigid thermoplastic phase.

Another aspect of the invention is injection moldable compositions comprising poly(alkylene terephthalate) and about 5–50% by weight of the synergistic impact modifier system described above. Another aspect of the invention is the process for improving poly(alkylene terephthalates) comprising blending therewith the snyergistic impact modifier system.

DETAILED DESCRIPTION OF THE INVENTION AND THE PREFERRED EMBODIMENTS

The poly($C_2$ to $C_8$ alkylene terephthalates) which are modified in accordance with this invention are polyesters having chain units containing an optionally substituted aromatic ring in the main chain of the polymer. Examples of the substituent for the aromatic ring are halogen atoms such as bromine or chlorine and $C_1$ to $C_4$ alkyl groups such as methyl, ethyl, propyl, and butyl groups. These aromatic polyesters can be obtained by reacting aromatic dicarboxylic acids, esters, or ester-forming derivatives thereof with glycol by known means.

Suitable glycols include polymethylene glycols having 2 to 6 carbon atoms, especially ethylene glycol, 1,4-butanediol, and 1,6-hexanediol; also, 1,4-hexanediol, 1,4-cyclohexanediol, 1,4-cyclohexanedimethylol, bisphenol A, neopentane diol, ester-forming derivatives thereof, and mixtures of these can be used.

Suitable aromatic dicarboxylic acids are naphthalene dicarboxylic acids such as naphthalene-2,6-dicarboxylic acid, terephthalic acid, isophthalic acid, p-hydroxybenzoic acid, adipic acid, sebasic acid, ester-forming derivatives thereof, and mixtures of these.

Examples of the preferred polyester (A) are poly-(ethylene terephthalate), poly(butylene terephthalate), and bisphenol A isophthalate, and the like. These polymers can be used alone or in combination.

The preferred polyester (A) has an intrinsic viscosity, as measured at 30° C. using a 60/40 solution of phenol/-tetrachloroethane, about 0.3 to about 2.5, more preferably 0.5 to 1.2, and most preferably 0.5 to 0.8.

The aromatic polycarbonate used for the composition of this invention is preferably a polycarbonate of a di(-monohydroxyphenyl)substituted aliphatic hydrocarbon; for example, it is possible to utilize an aromatic polycarbonate derived by the ester exchange process or phosgene process from 2,2-(4,4'-dihydroxydiphenyl)-propane (to be referred to simply as bisphenol A). Furthermore, it is possible to replace a part or whole of the bisphenol A by 4,4'-dihydroxydiphenylalkane, 4,4'-dihydroxydiphenylsulfone, or 4,4'-dihydroxydiphenyl ether. Or two or more of such polycarbonates may be used in admixture.

The polycarbonate (B) has a molecular weight of 15,000 to 100,000 preferably 20,000 to 50,000.

The multistage core/shell polymer is comprised of a crosslinked acrylic-based first stage which is graftlinked to an outer, rigid, thermoplastic stage. One or more intermediate phases are optional; for example, a middle stage polymerized from about 75 to 100% by weight styrene. The first stage is polymerized from about 75 to 99.8 weight-% $C_1$ to $C_6$ acrylate resulting in an acrylic rubber core having a $T_g$ below 10° C. and crosslinked with 0.1 to 5 weight-% crosslinking monomer and further containing 0.1 to 5% of a graftlinking monomer. The crosslinking monomer is a polyethylenically unsaturated monomer, such as butylene diacrylate and dimethylacrylate, divinylbenzene, trimethylolpropane triacrylate and trimethacrylate, and the like, having a purality of double bonds all of which polymerize at substantially the same rate. The graftlinking monomer is a polyethylenically unsaturated monomer having a plurality of double bonds, at least one of which polymerizes at a substantially different rate of polymerization from at least one other of said groups. Examples of graftlinking monomers are allyl methacrylate, diallyl maleate, and the like. The outer rigid thermoplastic phase is polymerized from a monomer system comprising about 50–100 weight-% of a $C_1$ to $C_4$ alkyl methacrylate. These core/shell polymers are prepared using conventional emulsion polymerization techniques.

The composition of the present invention comprises about 25 to 95% by weight aromatic polyester (A), about 1 to 50% by weight of aromatic polycarbonate (B), and the balance to make 100% of core/shell polymer (C).

The thermoplastic resin composition of this invention can be prepared by uniformly mixing the above resin components (A), (B), and (C) using any desired mixing means; for example, using a Banbury mixer, a hot roll, or a uniaxial or multiaxial extruder. The method of blending the three components to obtain the thermoplastic resin composition is not particularly limited. Generally, it is preferred that the components (A), (B), and (C) are blended simultaneously and the mixture extruded and pelletized.

The composition of this invention may be in various forms such as powder, granule, flake, pellet, or other forms of melt-shaped articles, or injection molded articles. The composition gives especially good results in the production of injection molded articles. Needless to say, the composition may further contain various additives such as a stabilizer, coloring agent, fire retardant, fluorescent bleaching agent, mold releasing agent, nucleating agent, plasticizer, lubricant, filler, or blowing agent.

The stabilizer may, for example, be an oxidation stabilizer, light stabilizer, or heat stabilizer. Specific examples of the light stabilizer are benzotriazole compounds such as 2-hydroxy-5-methylbenzotriazole or 2-hydroxy-3-chloro-5-t-butylbenzotriazole, benzophenone compounds such as 2,4-dihydroxybenzophenone, and phenyl salicylate-type compounds such as phenyl salicylate. Examples of the oxidation stabilizer include hindered phenol compounds such as stearyl 3,5-di-t-butyl-4-hydroxyphenyl propionate, and amine compounds such as N,N'-di-beta-naphthyl-para-phenylene diamine. Examples of heat stabilizer include sulfur compounds such as dilauryl thiopropionate and phosphorus compounds such as phosphoric acid, phosphorus acid, and phosphinic acid, or esters thereof.

The coloring agent may be any desired dye or pigment.

Examples of the fire retarding agent are halogen-containing aromatic compounds such as hexabromobenzene, tetrabromophthalic anhydride, an oligomeric polycarbonate of tetrabromobisphenol A, decabromobiphenyl, or decabromodiphenyl ether, and phosphorus compounds such as tris(2,3-dibromopropyl phosphate) or polyaryl phosphonates, the retarding agent being usable in conjunction with an assistant such as antimony trioxide.

Examples of the lubricant are barium stearate, calcium stearate, or fluid paraffin.

The nucleating agent may, for example, be an inorganic agent such as talc or graphite, an organic nucleating agent such as benzophenone, or a salt such as sodium terephthalate.

The filler includes, for example, fibrous reinforcement such as glass fibers, carbon fibers, asbestos, or rock wool, and particulate filler such as alumina, clacium carbonate, mica, and silica. The incorporation of these fillers is preferred because they give rise to more improvement in the mechanical characteristics, resistance to thermal deformation, and fire retardance of the composition of the invention. The use of glass fiber reinforcement has been found to improve greatly the service temperature, and its use is preferred. A preferred amount of glass fiber reinforcement is about 20 to 50% based on weight of the reinforced composition.

Preferably, the amounts of these additives are as follows based on 100 parts of resin composition: up to 5 parts by weight of the stabilizer; up to 30 parts by weight of the fire retardant (as a total amount, when the assistant is used); 0.01 to 5 parts by weight of the mold release agent; 0.05 to 5% by weight lubricant; 1 to 150 parts by weight of the filler. The amount of coloring agent is usually 0.01 to 5% by weight based on the total weight of the resins (A), (B), and (C).

The following examples illustrate the present invention in greater detail. All parts and percentages in the examples are on a weight basis.

EXAMPLES

Poly(ethylene terephthalate) having an intrinsic viscosity of 0.62 (as measured in a solution of 60/40 phenol/tetrachloroethylene at 25° C.), bisphenol A-polycarbonate having a molecular weight of 50,000, a core-shell, butyl acrylate-based impact modifier having the composition BA/BDA/DALM//MMA=79.2/0.4/0.4//20 were mixed together in the following proportions and extruded on a Welding Engineers 0.8", twin-screw extruder. Prior to extrusion the PET and PC were dried under vacuum at 120° C., and the acrylate-based core-shell polymer was dried at 60° C. under vacuum. The extrudate was pelletized, dried again at 120° C. to 0.02% water, and molded into standard ASTM test specimens on a 1.5-ounce Newbury reciprocating screw injection molding machine having a mold temperature of 140° C.

TABLE I
EFFECT OF POLYCARBONATE AND ACRYLATE-BASED CORE-SHELL POLYMER ON THE IMPACT STRENGTH OF PET

| Example | Polycarbonate (%) | Acrylate-Based Core-Shell Polymer (%) | Notched Izod Impact Strength (ft.-lb./in.) at | | | |
|---|---|---|---|---|---|---|
| | | | 23° C. | 40° C. | 60° C. | 80° C. |
| 1 | 0 | 0 | 0.22 | 0.19 | 0.22 | 0.16 |
| 2 | 5 | 0 | 0.22 | 0.19 | 0.17 | 0.19 |
| 3 | 0 | 30 | 1.11 | 1.10 | 1.27 | 1.31 |
| 4 | 5 | 25 | 1.61 | 2.30 | 15.2 | 16.2 |
| 5 | 0 | 35 | 1.50 | — | 2.30 | — |
| 6 | 5 | 30 | 3.00 | — | 16.9 | — |
| 7 | 10 | 25 | 15.8 | — | 15.6 | — |
| 8 | 15 | 20 | 17.7 | — | 16.2 | — |
| 9 | 20 | 15 | 18.4 | — | 17.2 | — |

The results of Examples 1–9 show that the addition of either PC or acrylate based core-shell polymer to PET results in only moderate improvements in impact strength, but the addition of both PC and acrylate-based core-shell polymer surprisingly results in a dramatic and synergistic increase in impact strength.

In Examples 10-14, PET, PC, acrylate-based core-shell polymer, and 3/16" chopped strand, glass fiber were dried, blended, extruded with 1" single-screw Killion extruder fitted with a vacuum vent, redried, and molded into test specimens at 140° C. mold temperature. Again, the surprising effect of PC and acrylate-based core-shell polymer on impact strength is seen.

TABLE II

EFFECT OF POLYCARBONATE AND ACRYLATE BASED CORE-SHELL POLYMER ON THE IMPACT STRENGTH OF GLASS REINFORCED PET

| Example | Fiberglass (%) | Acrylate based core-shell polymer (%) | Polycarbonate (%) | Izod (ft.-lb./in.) | DTUFL at 264 psi (°C.) |
| --- | --- | --- | --- | --- | --- |
| 10 | 30 | 0 | 0 | 1.42 | 235 |
| 11 | 30 | 17.5 | 0 | 2.06 | 229 |
| 12 | 30 | 14 | 3.5 | 2.30 | 222 |
| 13 | 30 | 14 | 7 | 2.43 | 200 |
| 14 | 30 | 17.5 | 7 | 2.78 | 172 |

We claim:

1. A composition having high impact resistance comprising:
   (a) about 25-95% of an aromatic polyester;
   (b) about 1 to 50% by weight of an aromatic polycarbonate;
   (c) the balance to make 100% of a core/shell polymer comprising about 25-95% by weight of a first elastomeric phase polymerized from a monomer system comprising about 75 to 99.8% by weight of a ($C_1$-$C_6$) alkyl acrylate, 0.1 to 5% crosslinking monomer, and 0.1 to 5% graftlinking monomer, and about 75 to 5% of a final, rigid thermoplastic phase.

2. The composition of claim 1 wherein the aromatic polyester is poly(ethylene terephthalate).

3. The composition of claim 2 wherein the poly(ethylene terephthalate) has an estimated intrinsic viscosity range of about 0.3 to 2.5.

4. The composition of claim 1 wherein said graftlinker monomer is allyl methacrylate or diallyl maleate.

5. The composition of claim 1 wherein the crosslinking monomer is butylene diacrylate.

6. The composition of claim 1 wherein said final rigid thermoplastic phase is polymerized from a monomer system comprising about 50 to 100% by weight of a $C_1$ to $C_4$ alkyl methacrylate.

7. The composition of claim 1 wherein the core/shell polymer contains an intermediate phase polymerized of a monomer system comprising from 75-100% by weight of styrene.

8. The composition of claim 1 further including filler comprising particulate filler, fibrous reinforcement, or combinations thereof.

9. The composition of claim 1 further including about 10 to 150 parts by weight of glass fiber reinforcement based on 100 parts of (A), (B), and (C).

10. The composition of claim 1 wherein the aromatic polycarbonate (B) is the reaction product of phosgene and bisphenol A.

11. An injection molded article molded from the composition of claim 1.

12. The composition of claim 1 further including up to 20% flame retardant, colorant, blowing agent, plasticizer, stabilizer and nucleating agents.

* * * * *